United States Patent [19]
Marui

[11] Patent Number: 5,435,204
[45] Date of Patent: Jul. 25, 1995

[54] BICYCLE HANDLE

[75] Inventor: Kohei Marui, Kobe, Japan

[73] Assignee: Marui Co., Ltd., Kobe, Japan

[21] Appl. No.: 234,822

[22] Filed: Apr. 28, 1994

Related U.S. Application Data

[62] Division of Ser. No. 14,456, Feb. 3, 1993.

[30] Foreign Application Priority Data

Feb. 5, 1992 [JP] Japan .................................. 4-20270
Jun. 17, 1992 [JP] Japan ................................ 4-158047

[51] Int. Cl.$^6$ .................... B62K 21/12; B62K 21/16
[52] U.S. Cl. .................... 74/551.4; 74/551.1; 74/551.3; 403/292
[58] Field of Search .................... 74/551.1–551.8; 280/279; 403/292

[56] References Cited

U.S. PATENT DOCUMENTS

| | | | |
|---|---|---|---|
| 575,936 | 1/1897 | Roso | 74/551.3 |
| 1,932,251 | 10/1933 | Nauts | 74/551.3 |
| 2,041,704 | 5/1936 | Gordon et al. | 74/551.3 |
| 2,366,061 | 12/1944 | Schwinn | 74/551.3 |
| 3,481,218 | 12/1969 | Yoshikawa | 74/551.3 |
| 3,655,219 | 4/1972 | Jacoby | 74/551.6 |
| 4,729,255 | 3/1988 | Moulton | 74/551.4 |
| 4,903,627 | 2/1990 | Nakamura | 74/551.3 X |
| 5,144,859 | 9/1992 | Malone | 74/551.3 |
| 5,199,322 | 4/1993 | Wu | 74/551.3 |
| 5,224,396 | 7/1993 | Lobbezoo et al. | 74/551.1 X |

FOREIGN PATENT DOCUMENTS

| | | | |
|---|---|---|---|
| 0072688 | 2/1983 | European Pat. Off. | 74/551.3 |
| 33670 | 11/1885 | Germany | 74/551.3 |
| 918855 | 10/1954 | Germany | 74/551.4 |
| 1236359 | 3/1967 | Germany | 74/551.3 |
| 359993 | 6/1938 | Italy | 74/551.4 |
| 431162 | 2/1948 | Italy | 74/551.4 |
| 728898 | 12/1966 | Italy | 74/551.4 |
| 47-20484 | 6/1972 | Japan . | |
| 47-20485 | 6/1972 | Japan . | |
| 52-93035 | 8/1977 | Japan . | |
| 59-89282 | 5/1984 | Japan . | |
| 1-96394 | 6/1989 | Japan . | |
| 20769 | of 1897 | United Kingdom | 74/551.4 |
| 395697 | 7/1933 | United Kingdom | 74/551.3 |
| 578359 | 6/1946 | United Kingdom | 74/551.3 |
| 1571841 | 7/1980 | United Kingdom | 74/551.3 |

Primary Examiner—Vinh T. Luong
Attorney, Agent, or Firm—Steven M. Rabin

[57] ABSTRACT

A bicycle handle consists of a horizontal bar-binding cylinder provided on a handle stem, a pair of handle bars fixed in both ends of the bar-binding cylinder and one or two pressure cylinders holding the handle bars. A through hole perforated in the pressure cylinder inclines from an axis of the bar-binding cylinder. Each handle bar has a handle grip at an end of it. The handle, bars are inserted into the pressure cylinder. When the pressure cylinder alone rotates, since a slanting direction of the through hole is changed, an projecting angle of the handle bar inserted into the through hole from the bar-binding cylinder is changed. So a position of the handle grip can be changed easier.

12 Claims, 5 Drawing Sheets

BICYCLE HANDLE

CROSS-REFERENCE TO RELATED APPLICATION

This application is a divisional application of applicant's co-pending application Ser. No. 08/014,456, filed Feb. 3, 1993.

FIELD OF THE INVENTION

This invention relates to a bicycle handle. In particular, the invention relates to a bicycle handle wherein a pair of handle bars are inserted and fixed into both ends of a horizontal bar-binding cylinder provided on a handle stem.

BACKGROUND OF THE INVENTION

In general, a construction of a bicycle handle is divided into two types, a type wherein a handle bar and a handle stem are united and a type wherein they are not. And as the handle bar, there also are two types, a type wherein a right handle bar and a left handle bar are united and a type wherein they are not.

Figure 11:
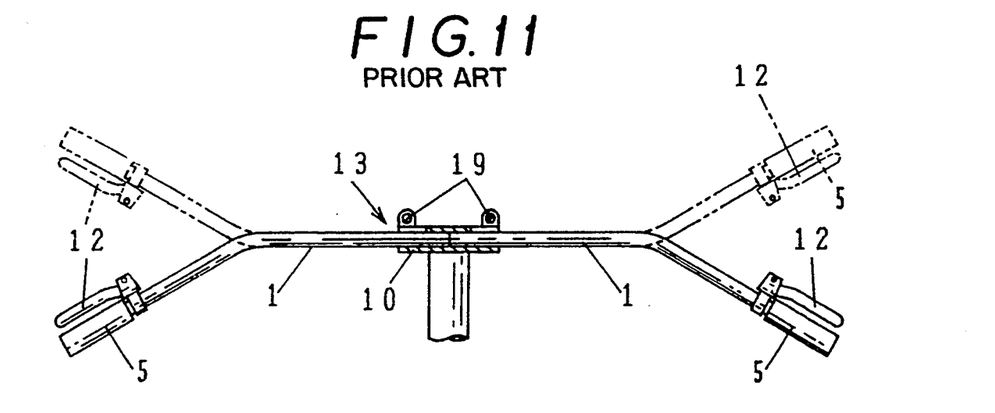
FIG. 11 is a partial sectional view of a conventional bicycle handle.

As shown in FIG. 11, in the type of handle bar separated into a right bar and a left bar, one end of each handle bar 1 is an insertion end to be inserted into a corresponding end of a horizontal bar-binding cylinder 10 of a handle stem 13, the other end of the handle bar 1 having a handle grip 5. The bar-binding cylinder 10 is tightened by bolts 19 so that the handle bars 1 will not rotate in the bar-binding cylinder 10.

When the bolts 19 are loosened, the handle bars 1 can rotate in the bar-binding cylinder 10. Thereby, it is possible to change positions of the handle grips 5 depending on the most suitable posture of the handle bars for a rider.

In the above mentioned bicycle handle, however, since the handle bars themselves rotate in the bar-binding cylinder 10, as shown in two-dot chain line in FIG. 11, brake levers 12 provided forward of the handle grips 5 rotate together with the handle bars 1. Accordingly, in the above-mentioned bicycle handle, when the positions of the handle grips 5 are changed, the positions of the brake levers 12 must be adjusted. And the adjustment of the brake levers 12 makes changing the positions of the handle grips 5 very difficult.

Besides, it is impossible to change the positions of the handle grips 5 in a handle bar constructed as a straight body.

An object of this invention is to provide a bicycle handle having handle grips, and break levers, wherein the positions of the handle grips can be changed easily. Another object of this invention is to provide a bicycle handle having handle grips and brake levers, wherein the positions of the handle grips can be changed, even if the handle bar is a straight member.

SUMMARY OF THE INVENTION

The bicycle handle according to the first invention comprises a bar-binding cylinder 10 provided on a handle stem, a pair of handle bars 1 inserted and fixed into both ends of the bar-binding cylinder 10, a handle grip 5 formed on one end of each handle bar 1, a pressure cylinder 2 inserted into the bar-binding cylinder 10, a through hole 20 in the pressure cylinder 2 and bent at the center (midpoint) of it symmetrically, a diameter of the through hole 20 being a little larger at the midpoint than at an insertion end of the handle bar 1 and a tightening means 8 for tightening the bar-binding cylinder 10 in a radial direction.

The function of the bicycle handle of the invention will now be explained. The pressure cylinder 2 is inserted into the bar-binding cylinder 10 and the insertion ends of the handle bars 1 are inserted into both ends of the through hole 20 of the pressure cylinder 2. Thereafter, the bar-binding cylinder 10 is tightened in the radial direction by the tightening means 8. Thereby, since an inner surface of the bar-binding cylinder 10 presses against an outer surface of the pressure cylinder 2, the diameter of the through hole 20 becomes smaller by the pressing force of the bar-binding cylinder 10. The insertion end of the handle bar 1 then receives pressure from a cylindrical wall of the pressure cylinder 2. Thereby, the bar-binding cylinder 10, the pressure cylinder 2 and the handle bars 1 are fixed by a frictional force caused by the above mentioned pressing forces.

In the meantime, the through hole 20 bends at the center of the pressure cylinder 2 symmetrically. In other words, the through hole 20 consists of a pair of symmetric slanting holes. When the insertion ends of the handle bars 1 are inserted into both ends of the through hole 20 of the pressure cylinder 2, the handle bars 1 project out of both ends of the bar-binding cylinder 10 with axes of the handle bars inclined to an axis of the bar-binding cylinder 10.

When the position of handle grip 5 is to be adjusted, the tightening means 8 is loosened so that the handle bar 1 and the pressure cylinder 2 may rotate in the bar-binding cylinder 10 independently, and only pressure cinder 2 is made to rotate. Since a slating direction of the through hole 20 is changed by rotation of the pressure cylinder 2, the projecting angle of the handle bar 1 inserted into the through hole 20 from the bar-binding cylinder 10 also may be changed. At the same time, a brake lever 12 must remain forward of the handle grip 5. After that, by tightening the tightening means 8, the pressure cylinder 2 and the handle bars 1 are fixed in the bar-binding cylinder 10 again. Namely, since the projecting direction of the handle bar 1 from the bar-binding cylinder 10 is changed, the position of the handle grip 5 also may be changed.

In the bicycle handle of this embodiment of the invention, the position of the handle grip 5 can be changed more easily, since an extra adjustment for the brake lever will not be necessary because the pressure cylinder 2 is made to rotate in the bar-binding cylinder 10. Since the projecting angle of the handle bar 1 from the bar-binding cylinder 10 can be changed, it is possible to change the positions of the handle grips 5 even if the handle bars are straight members as a whole.

A bicycle handle of the second invention comprises a bar-binding cylinder 10 provided on a handle stem, a pair of handle bars 1 arranged at both ends of the bar-binding cylinder 10, handle grips 5 provided on one end of each handle bar, and a pair of pressure cylinders 7, a through hole 70 being provided in each of the pressure cylinders 7. Through hole 70 consists of an inside hole, and an outside hole which slants from the inside hole. The diameter of the inside hole of the through hole 70 is a little larger than an outer diameter of the bar-binding cylinder 10. The diameter of the outside hole of the through hole 70 is a litter larger than the diameter of the insertion end of the handle bar 1. A slit 73 opens in a cylindrical wall of the pressure cylinder 7 along the axial direction, and bolts 75, 751 are provided for tightening the pressure cylinder 7 by drawing toward each other side walls facing each other across the slit 73. The pressure cylinder 7 is fitted on both the end of the bar-binding cylinder 10 and the insertion end of the handle bar 1.

In the bicycle handle of the second invention, one end of the bar-binding cylinder 10 is inserted into the inside hole and the insertion end of one handle bar 1 is inserted into the outside hole of the through hole 70 of one pressure cylinder 7. The other end of the bar-binding cylinder 10 and the insertion end of the other handle bar 1 are inserted into the respective opposite ends of the through hole 70 of the other pressure cylinder 7 in the same way. Since the outside hole slants from the inside hole, the through hole 70 is not straight.

The side walls facing each other across the slit 73 are drawn toward each other by the bolts 75, 751 so that an inner diameter of the pressure cylinder 7 becomes smaller. Thereby, the handle bar 1 is connected to the bar-binding cylinder 10 by a pressing force from the pressure cylinder 7.

When the position of handle grip 5 is changed after loosening the bolts 75, 751, only pressure cylinder 7 is made to rotate. Then, since the outside hole provided for the handle bar slants from the inside hole provided for the bar-binding cylinder 10, by rotation of the pressure cylinder 7, the direction in which the outside hole for the handle bar slants is changed. Thus, the angle at which the handle bar 1 projects from the pressure cylinder 7 also is changed. At this time, the brake levers 12 must remain forward of the handle grips 5. After that, the bolts 75, 751 are tightened again.

DETAILED DESCRIPTION OF THE PREFERRED EMBODIMENTS

Four embodiments will be explained with reference to the several figures of the accompanying drawings.

Embodiment 1

Figure 1:
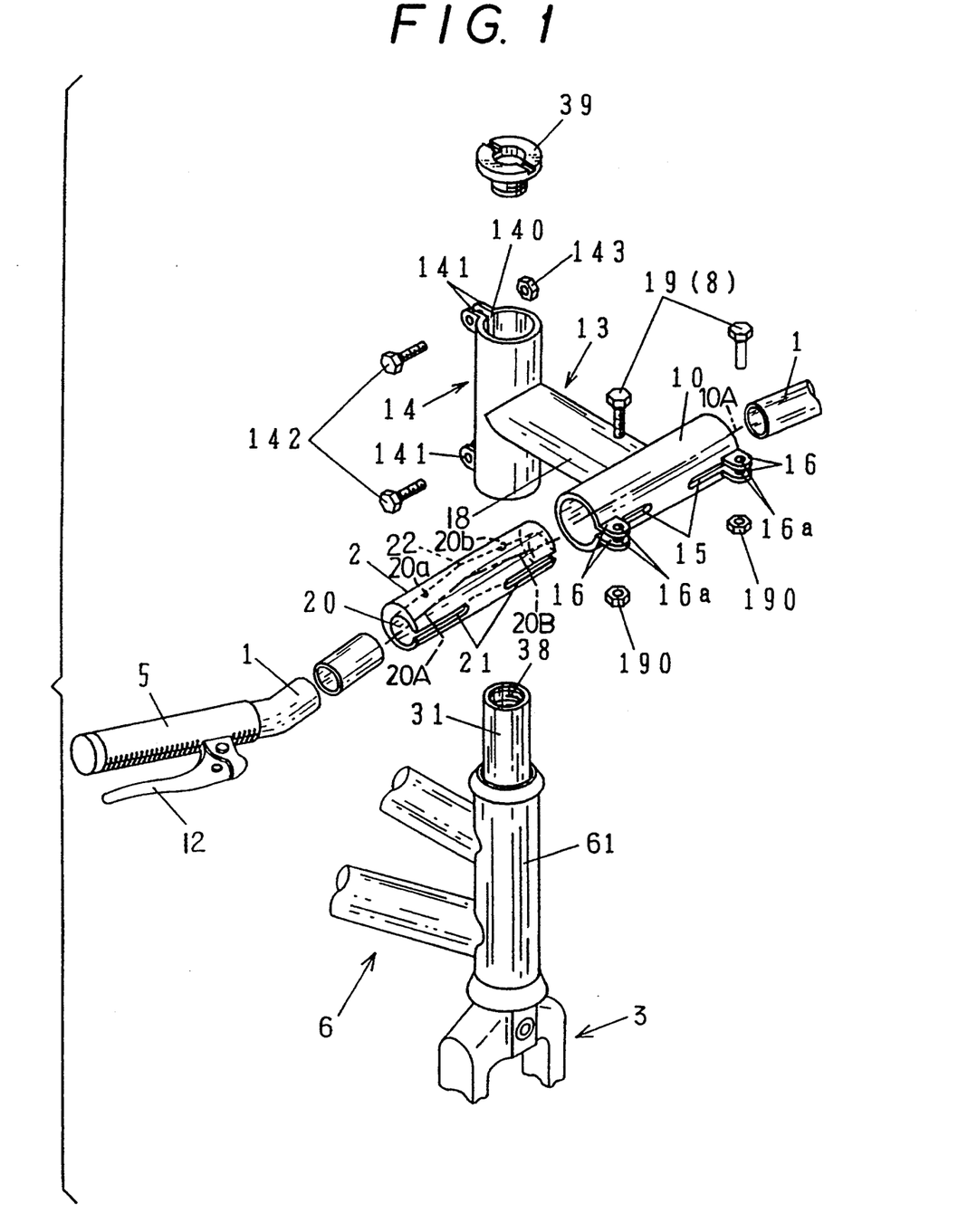
FIG. 1 is an exploded perspective view of a bicycle handle according to a first embodiment of the invention.
Figure 2:
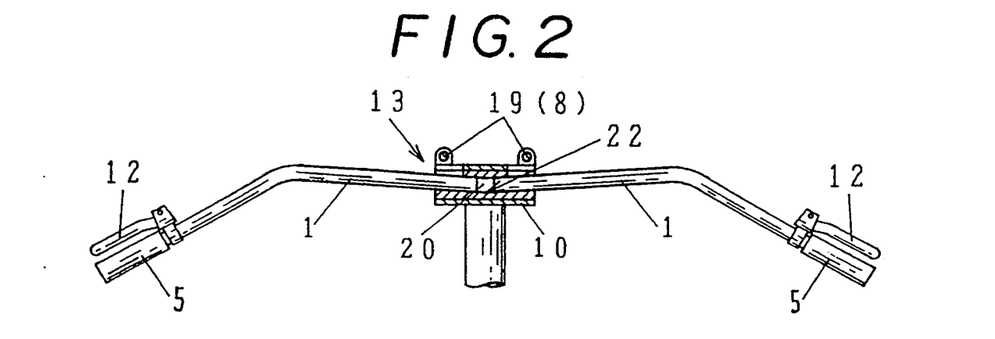
FIG. 2 is a partial cross-sectional plan view of a binding portion of the bicycle handle of the first embodiment.
Figure 3:
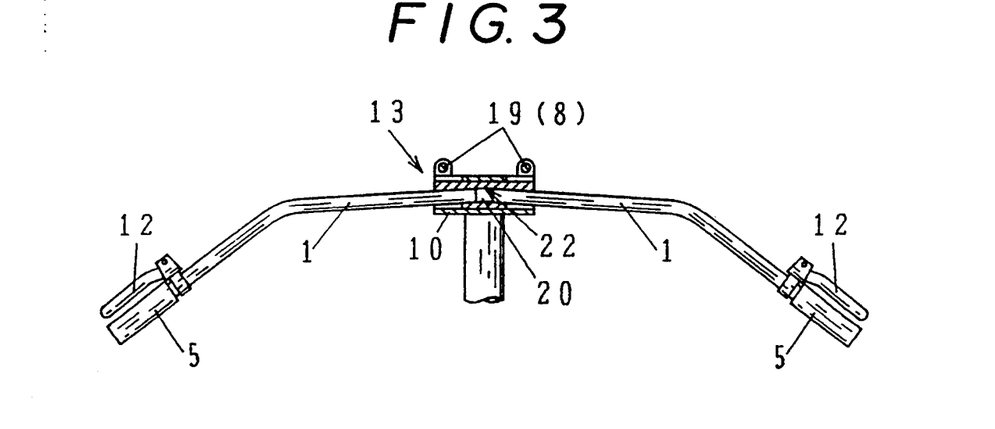
FIG. 3 is a partial horizontal cross-sectional view of the binding portion of the bicycle handle after adjusting the angle of the handle bars.

FIGS. 1-3 show a skeletal form of the construction of a bicycle handle according to the first embodiment. In this first embodiment, a pressure cylinder 2 having a through hole 20 is inserted into a bar-binding cylinder 10 having a longitudinal axis 10A. The through hole 20 is bent at the center of the pressure cylinder 2 symmetrically to define first and second holes 20a and 20b having axes 20A and 20B that slant relative to the longitudinal axis 10A. The diameter of the through hole 20 is a little larger than the diameter of handle bar 1 and is able to become smaller by a pressing force of the bar-binding cylinder 10 in the radial direction.

A handle stem in the first embodiment, having a construction that is the same as that of a conventional bicycle handle, is fitted and fixed on a fork stem formed on a top of a fork blade of a front fork for a bicycle. As shown in FIG. 1, the fork stem 31 of the front fork 3 is inserted rotatably into a head tube 61 in a skeleton frame 6.

The handle stem 13 mounted on the fork stem 31 consists of a supporting cylinder 14 having a slit 140, bar-binding cylinder 10 having a pair first of slits 15 and supporting two handle bars 1, and a connecting cylinder 18. The slit 140 is opened from end to end in the cylindrical wall of the supporting cylinder 14 along the axial direction. The slits 15 are opened at the respective opposite ends of the cylindrical wall of the bar-binding cylinder 10. The bar-binding cylinder 10 has horizontal tightening ears 16 as means for tightening the ends of the bar bending cylinder 10 by applying radial pressure to said ends. The ears 16 face each other across the slits 15. A vertical bolt bore 16a is provided in each tightening ear 16.

The pressure cylinder 2, an outer diameter of which is a little smaller than an inner diameter of the bar-binding cylinder 10, is inserted into the bar-binding cylinder 10. The thickness of the cylindrical wall of the pressure cylinder 2 is non-uniform. The through hole 20 in the pressure cylinder 2 is bent at its midpoint symmetrically. In other words, the through hole 20 consists of two symmetric slanting holes. The diameter of the through hole 20 is a little larger than the diameter of the handle bar 1. A pair of second slits 21 is provided in the cylindrical wall of the pressure cylinder 2. The slits open at respective opposite ends of the pressure cylinder 2, preferably in the thickest-walled portion or the thinnest-walled portion.

Next, the processes of assembling the bar-binding cylinder 10 and of adjusting the handle bars 1 will be explained.

The supporting cylinder 14 mounted to one end of the connecting cylinder 18 is fitted on the upper part of the fork stem 31 of the front fork 3. The supporting cylinder 14 has tightening ears 141 which face each other across the slits 140. The tightening ears 141 are tightened by bolts 142 and nuts 143. Thereby, the handle stem 13 is fixed on the fork stem 31 of the front fork 3. After that, a blank cap 39 is screwed in the thread 38 of an inner surface of the fork stem 31.

Then, after inserting the pressure cylinder 2 into the bar-binding cylinder 10, the insertion ends of the handle bars 1 are inserted into the respective ends of the through hole 20 of the pressure cylinder 2. In this condition, when the bolts 19 are inserted into the bolt bores 16a, and the tightening ears 16 are tightened by bolts 19 and nuts 190, as the tightening means 8, the width of the slit 15 becomes narrow. Thus, the diameter of the bar-binding cylinder 10 becomes smaller and the outer surface of the pressure cylinder 2 is pressed by the inner surface of the bar-binding cylinder 10. As a result, the width of each slit 21 becomes narrow under a force to the pressure cylinder 2, and the diameter of the pressure cylinder 2 becomes smaller and the insertion ends of the respective handle bar 1 are pressed by the inner surface of the through hole 20 of the pressure cylinder 2. Accordingly, the handle bars 1 are fixed to the bar-binding cylinder 10 at a certain angle.

When we want to change angles of the handle bars 1 so that handle grips 5 may be drawn near a rider, after loosening the bolts 19, the handle bars 1 are extracted from the pressure cylinder 2, and the pressure cylinder 2 is made to rotate by an angle of 180 degrees so that a bending point 22 at the center of the through hole 20 points to the front of the bicycle, as shown in FIG. 3. The insertion ends of the handle bars 1 then are inserted into the opposite ends of the through hole 20 of the pressure cylinder 2 again. Since the direction in which the through hole 20 slants has been changed, the angle at which the handle bar 1 projects from the bar-binding cylinder 10 is also changed. The handle bars 1 must be maintained in their attitude so that the brake levers 12 are arranged forward of the handle grips 5. After that, the bar-binding cylinder 10 is tightened by the bolts 19 and the nuts 190 in the manner stated above. Thereby, the pressure cylinder 2 is fixed in the bar-binding cylinder 10. Since the projecting angle of the handle bars 1 can be changed in this manner, the positions of the handle grips 5 can also be changed, without an adjustment for the arrangement of the brake levers 12.

If the handle bars 1 and the pressure cylinder 2 are able to rotate relative to each other in the bar-binding cylinder 10, it may be unnecessary to extract the handle bars 1 from the pressure cylinder 2. Namely, when the pressure cylinder 2 alone is made to rotate clockwise or counterclockwise to a proper degree in the bar-binding cylinder 10, the handle bars 1 are not made to rotate together with the pressure cylinder 2. Thereby, it is possible to change the angles of the handle bars 1 by various amounts without an extra adjustment.

Embodiment 2

Figure 4:
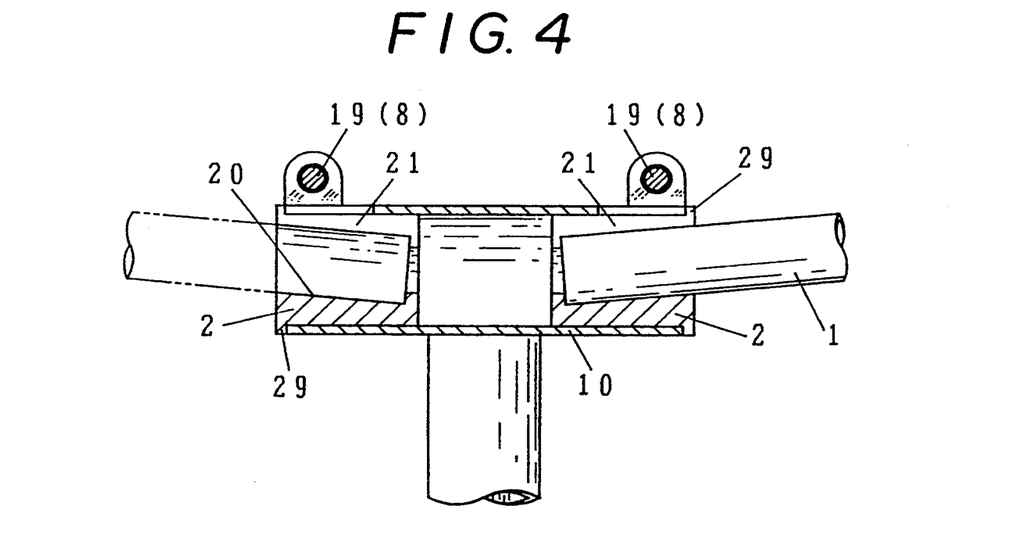
FIG. 4 is an enlarged detailed horizontal sectional view of a binding portion of a bicycle handle according to a second embodiment of the invention.
Figure 5:
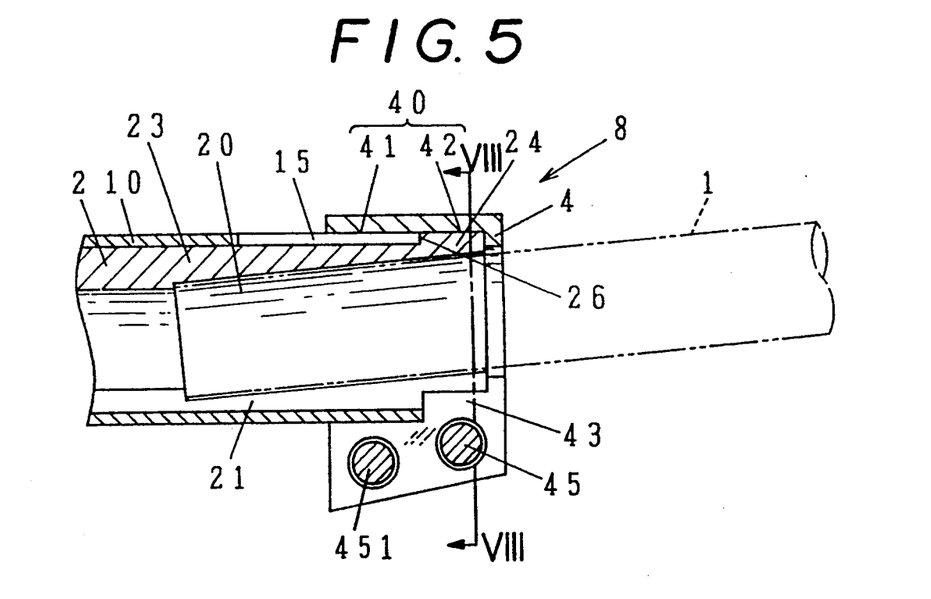
FIG. 5 is a partial enlarged detailed horizontal sectional view of a binding portion of a bicycle handle according to a third embodiment of the invention.

Next, the second embodiment, as shown in FIG. 4, will be explained.

In this bicycle handle, the pressure cylinder is divided into two cylinders 2 having a slanting through hole 20. The pressure cylinders 2 are respectively inserted into the opposite ends of the bar-binding cylinder 10. A slit 21 is provided in the cylindrical wall of the pressure cylinder 2 along its axis from end to end. A flange 29, which collides with the end of the bar-binding cylinder 10, is formed throughout an entire periphery of the one end of the pressure cylinder 2, for positioning. In this bicycle handle, the divided pressure cylinders 2 are inserted into the respective ends of the bar-binding cylinder 10. An insertion end of each handle bar 1 is inserted into a respective end of the through hole 20 of the pressure cylinder 2. When the bolts 19 are tightened, the same forces are created as in the above-described first embodiment, so the handle bar 1 is fixed in the through hole 20.

Besides, since the divided pressure cylinders 2 are inserted into the ends of the bar-binding cylinder 10 only, it is possible to lighten the weight of the pressure cylinder in comparison with the non-divided pressure cylinder of the above-mentioned first embodiment.

Embodiment 3

FIG. 5 to FIG. 8 show another bicycle handle as the third embodiment. A pressure cylinder is divided into two pressure cylinders 2. Each pressure cylinder 2 consists of a first cylinder 23, and a second cylinder 24 which is eccentric to the first cylinder 23. A through hole 20, includes a slanting hole 20b having an axis 20B which slants from the axis of the cylinder, is provided in each of the pressure cylinders 2, as shown in the above-mentioned FIG. 4. A slit 21 is provided in the cylindrical wall of the pressure cylinder 2 along the axis, from end to end. The first cylinder 23 of the pressure cylinder 2 is inserted into a bar-binding cylinder 10 having an axis 10A, so that the axis 20 also slants relative to the axis 10A. Clamping rings 4 as a tightening means 8 tighten both ends of the bar-binding cylinder 10 and the pressure cylinders 2 projecting out of the bar-binding cylinder 10, by applying radial pressure to said ends. A tightening hole 40 in each clamping ring 4 consists of a small diameter hole 42 and a large diameter hole 41. An inner surface of the small diameter hole 42 presses against the outer surface of the pressure cylinder 2, and an inner surface of the large diameter hole 41 presses against the outer surface of the bar-binding cylinder 10. A slit 43 is provided in the wall of the clamping ring 4, from end to end. The two side walls facing each other across the slit 43 are tightened by bolts 45, 451 which are hexagonal socket head cap bolts.

In this embodiment, when the pressure cylinders 2 are inserted into the respective ends of the bar-binding cylinder 10, a step 26 between the first cylinder 23 and the second cylinder 24 of each pressure cylinder 2 abuts with the end of the bar-binding cylinder 10. Therefore, the first cylinders 23 alone are inserted into the respective opposite ends of the bar-binding cylinder 10, and the second cylinders 24 project out of the respective opposite ends of the bar-binding cylinder 10. The two clamping rings 4 are fitted on the respective ends of the bar-binding cylinder 10, and the respective second cylinders 24, 241 of the pressure cylinders 2, and then the handle bars 1 are inserted into the through holes 20 of the pressure cylinders 2. After that, the side walls of the slit 43 of each clamping ring 4 are drawn together by the bolts 45, 451. Thus, the outer surfaces of the ends of the bar-binding cylinder 10 are pressed by the inner surface of the large diameter hole 41 of each of the clamping rings 4. And the outer surface of each second cylinder 24 is pressed by the inner surface of the small diameter hole 42 of the respective clamping ring 4. As a result, the handle bar 1 receives pressure from the inner surface of the pressure cylinder 2. Thereby, the handle bars 1 are fixed in the pressure cylinders 2.

Figure 6:
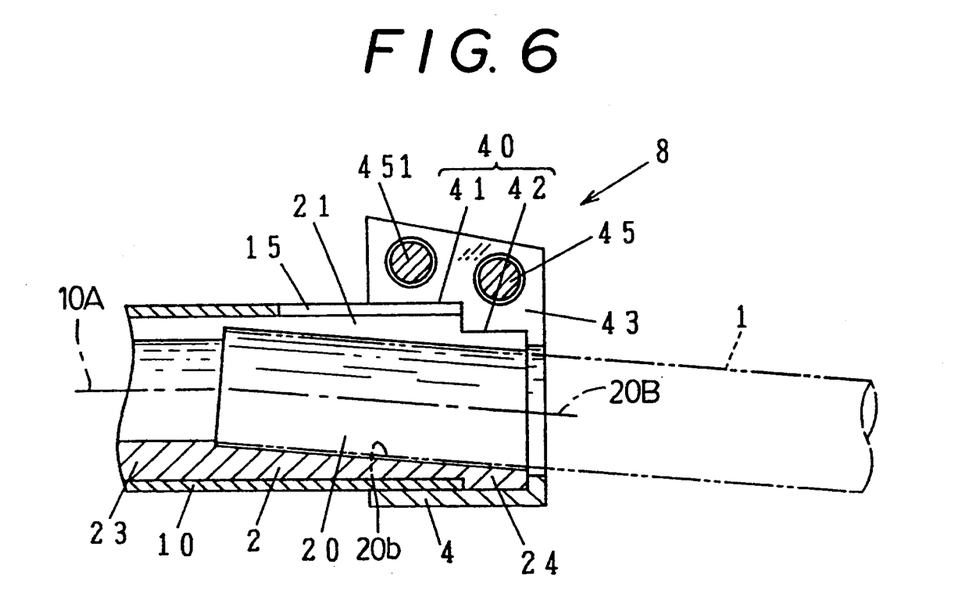
FIG. 6 is a partial enlarged horizontal sectional view of the binding portion of the bicycle handle of the third embodiment after adjustment of an angle of a handle bar.
Figure 7:
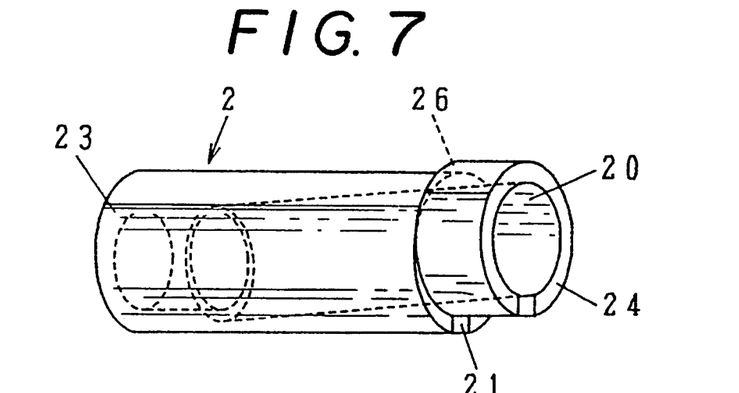
FIG. 7 is a perspective view of a pressure cylinder or the third embodiment of the invention.
Figure 8:
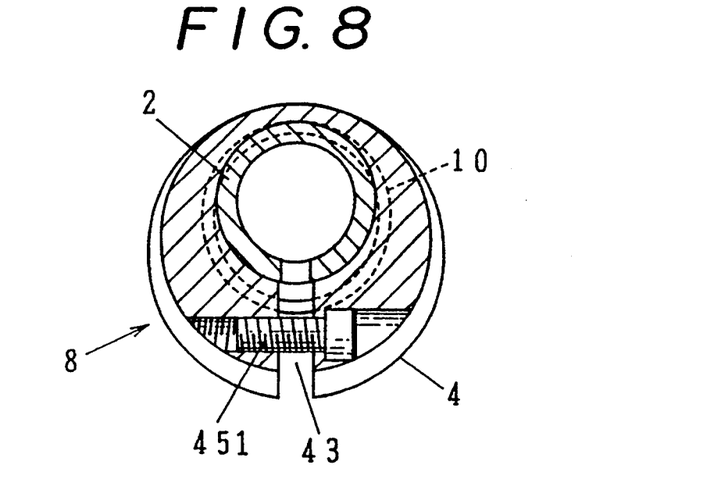
FIG. 8 is a sectional view, taken in a plane VIII—VIII of FIG. 5, of a clamping ring of the third embodiment.

When the bolts 45, 451 are loosened, the pressure cylinders 2 can rotate in the bar-binding cylinder 10. At this time, the handle bars 1 cannot be made to rotate. After that, the bolts 45, 451 are tightened again. Since the direction in which the through hole 20 slants is changed by rotation of the pressure cylinder 2, the angle at which the handle bar 1 inserted into the through hole 20 projects, changes too. Since the handle bar 1 is not made to rotate, however, the brake levers 12 remain forward of the handle grips 5. Namely, the positions of the handle grips 5 can be changed to various positions without adjusting for the brake levers 12.

In the embodiment shown in FIG. 5 to FIG. 8, slits 15 in the cylindrical wall of the bar-binding cylinder 10 open toward the cylindrical wall ends. By the slits 15, the diameter of the bar-binding cylinder 10 can be compressed. So, in this embodiment, the inner surface of the bar-binding cylinder 10 presses intensively against the outer surface of each pressure cylinder 2. However, the slits 15 do not always need opening.

Embodiment 4

Figure 9:
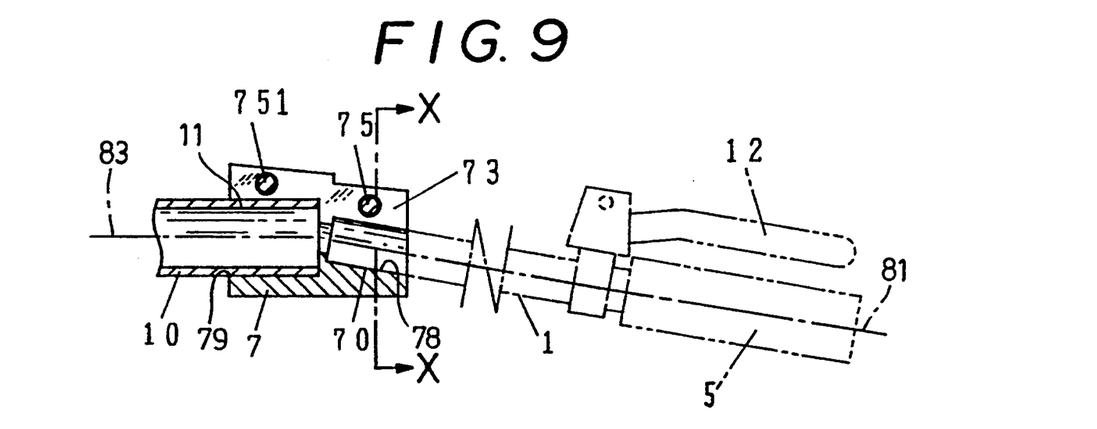
FIG. 9 is a partial enlarged detailed horizontal sectional view of a binding portion of a bicycle handle according to a fourth embodiment of the invention.
Figure 10:
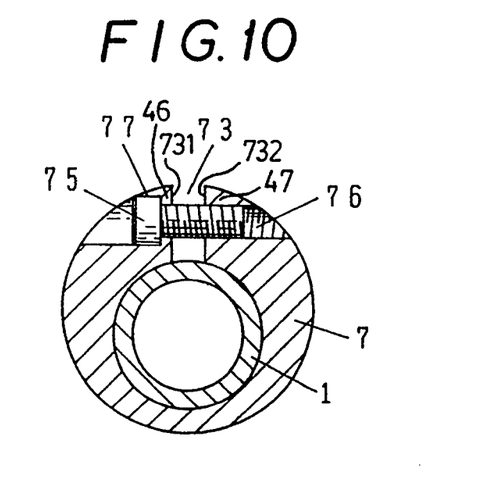
FIG. 10 is a sectional view, taken in a plane X—X of FIG. 9, of a pressure cylinder of the fourth embodiment.

FIG. 9 and FIG. 10 show another bicycle handle according to a fourth embodiment of the invention.

A pressure cylinder is divided into two pressure cylinders 7. A slit 73 is provided in the wall of each pressure cylinder 7 so as to extend axially from end to end. Then, the pressure cylinder 7 is C-shaped in cross section. A through hole 70 in the pressure cylinder 7 consists of an inside hole 78, and an outside hole 79 having an axis 81 slanting from axis 83 of the inside hole. The diameter of the inside hole is a little larger than an outer diameter of a bar-binding cylinder 10, the bar-binding cylinder 10 being provided on a handle stem 13 See FIG. 1. The diameter of the outside hole is a little larger than the diameter of handle bar 1. Two opposing side walls 46 and 47 of the pressure cylinder 7 have respective surfaces 731 and 732 which face each other across the slit 73. One of the side walls 46 has a threaded hole 76. The other side wall 47 has a through hole 77. A bolt 75 is inserted into the through hole 77 and is screwed into the threaded hole 76. Thus, by tightening the bolt 75, the opposing surfaces 731 and 732 are urged toward each other so that the inner diameters of the pressure cylinder 7 become smaller.

As shown in FIG. 9, an end 11 of the bar-binding cylinder 10 is inserted into the inside hole, and the handle bar 1 is inserted into the outside hole of the through hole 70. Then the pressure cylinder 7 is tightened by the bolts 75, 751 in the radial direction. Thus, the handle bar 1 and the bar-binding cylinder 10 are pressed and fixed in the pressure cylinder 7.

If the bolts 75, 751 are loosened, each pressure cylinder 7 can be rotated on the bar-binding cylinder 10. So since a direction in which the outside hole of the through hole 70 slants is changed, an angle at which the handle bar 1 projects from the pressure cylinder 7 is changed. When the pressure cylinder 7 rotates on the bar-binding cylinder 10, the handle bar 1 is not made to rotate together with the pressure cylinder. After that, the bolts 75, 751 are tightened again. Therefore, since the projecting angle of the handle bars 1 can be changed in the manner stated above, the positions of the handle grips 5 can be changed too.

What I claim is:

1. A bicycle handle comprising:
   a handle stem:
   a horizontal bar-binding cylinder provided on the handle stem;
   a pair of handle bars inserted and fixed in both ends of the bar-binding cylinder, the bar-binding cylinder having a cylindrical wall with at least one first slit, the at least one first slit extending in an axial direction;
   a pressure cylinder inserted into the bar-binding cylinder rotatably, a through hole perforating the pressure cylinder in a longitudinal direction bending at a center of said pressure cylinder symmetrically, the handle being inserted into the through hole rotatably, at least one second slit opening in a cylindrical wall of the pressure cylinder in the axial direction toward both ends of the pressure cylinder; and
   tightening means for tightening both ends of the bar-binding cylinder in a radius direction when the handle bars are inserted into the pressure cylinder which is inserted into the bar-binding cylinder.

2. A bicycle handle comprising:
   a handle stem;
   a horizontal bar-binding cylinder provided on said handle stem, said bar-binding cylinder having a longitudinal axis, first and second ends, and at least one first slit, the at least one first slit extending end-to-end in the directions of the longitudinal axis and opening at said first and second ends;
   pressure cylinder means, rotatably mounted in said bar-binding cylinder at least at said first and second ends, said pressure cylinder means having first and second holes opening at opposite ends of said pressure cylinder means, respectively adjacent said first and second ends, said first and second holes having respective first and second axes, each of the first and second axes slanting relative to said longitudinal axis, said pressure cylinder means having at least one second slit, the at least one second slit extending end-to-end in the directions of the longitudinal axis and opening at opposite ends of said pressure cylinder means adjacent said first and second ends;
   first and second handle bars, rotatably mounted in the respective first and second holes of the pressure cylinder means; and
   means for applying radial pressure to said opposite ends of said pressure cylinder means so as to tighten a connection between said first and second handle bars and said first and second ends of said bar-binding cylinder.

3. A bicycle handle as claimed in claim 2, wherein said radial pressure applying means includes first and second clamping rings respectively on said first and second ends of said bar-binding cylinder.

4. A bicycle handle as claimed in claim 2, wherein said pressure cylinder means has thickest-walled portions and thinnest-walled portions at said opposite ends thereof, and said at least one second slit opens in the thickest-walled portions or thinnest-walled portions of said opposite ends.

5. A bicycle handle as claimed in claim 2, wherein said radial pressure applying means includes
   tightening ears facing each other across said at least one first slit in said bar-binding cylinder, and
   nuts and bolts for drawing said facing tightening ears toward each other.

6. A bicycle handle as claimed in claim 2, wherein said pressure cylinder means comprises first and second pressure cylinders respectively inserted in said first and second ends of said bar-binding cylinder, said first pressure cylinder having said first hole, said second pressure cylinder having said second hole, said at least one second slit including one longitudinally extending slit in a cylindrical wall of said first pressure cylinder and another longitudinally extending slit in a cylindrical wall of said second pressure cylinder.

7. A bicycle handle as claimed in claim 6, wherein said first and second pressure cylinders have respective projecting portions respectively projecting from said first and second ends of said bar-binding cylinder, said radial pressure applying means including a first clamping ring on the projecting portion of said first pressure cylinder and on said first end of said bar-binding cylinder and a second clamping ring on the projecting portion of said second pressure cylinder and on said second end of said bar binding cylinder.

8. A bicycle handle as claimed in claim 7, wherein said projecting portion of each of said first and second pressure cylinders is eccentric to a remaining portion of each of said first and second pressure cylinders in the first and second ends of said bar-binding cylinder.

9. A bicycle handle as claimed in claim 6, wherein said at least one second slit opens in respective thickest-walled portions or thinnest-walled portions of said opposite ends of said first and second pressure cylinders.

10. A bicycle handle as claimed in claim 6, wherein said radial pressure applying means includes
tightening ears facing each other across said at least one first slit in said bar-binding cylinder, and
nuts and bolts for drawing said facing tightening ears toward each other.

11. A bicycle handle as claimed in claim 2, wherein said pressure cylinder means comprises one cylindrical member having a through hole extending from one of said opposite ends to the other of said opposite ends, said through hole including said first and second holes.

12. A bicycle handle as claimed in claim 2, wherein the first and second axes of said first and second holes are slanted symmetrically relative to the longitudinal axis.

* * * * *